(12) United States Patent
Lee et al.

(10) Patent No.: US 8,182,010 B2
(45) Date of Patent: May 22, 2012

(54) ROBOT HAND AND HUMANOID ROBOT HAVING THE SAME

(75) Inventors: Ja Woo Lee, Seoul (KR); Yong Jae Kim, Seoul (KR); Kang Min Park, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 271 days.

(21) Appl. No.: 12/591,503

(22) Filed: Nov. 20, 2009

(65) Prior Publication Data

US 2010/0156125 A1 Jun. 24, 2010

(30) Foreign Application Priority Data

Dec. 22, 2008 (KR) ........................ 10-2008-0131030

(51) Int. Cl.
*B25J 15/06* (2006.01)
*B25J 13/08* (2006.01)
*B25J 15/08* (2006.01)

(52) U.S. Cl. ....... 294/198; 294/106; 294/183; 294/64.2; 294/907; 901/37; 901/40

(58) Field of Classification Search .................. 294/198, 294/200, 202, 106, 115, 213, 907, 183, 64.2, 294/186; 901/37, 40, 46, 49; 623/64
See application file for complete search history.

(56) References Cited

U.S. PATENT DOCUMENTS

| | | | | | |
|---|---|---|---|---|---|
| 2,559,017 | A | * | 7/1951 | Hanson | 623/44 |
| 2,659,896 | A | * | 11/1953 | Biasi | 623/64 |
| 3,694,021 | A | * | 9/1972 | Mullen | 294/106 |
| 4,348,044 | A | * | 9/1982 | Wood, III | 294/202 |
| 4,667,998 | A | * | 5/1987 | Borcea et al. | 294/203 |
| 4,723,503 | A | * | 2/1988 | Yuda | 116/204 |
| 4,730,861 | A | * | 3/1988 | Spencer | 294/86.4 |
| 4,834,761 | A | * | 5/1989 | Walters | 623/26 |

* cited by examiner

*Primary Examiner* — Dean Kramer
(74) *Attorney, Agent, or Firm* — Staas & Halsey LLP

(57) ABSTRACT

Disclosed are a robot hand and a humanoid robot having the same. The robot hand includes a plurality of finger members and a base member to which one end of the finger members is rotatably coupled, respectively. The finger members are rotated through pneumatic pressure so that intervals between adjacent finger members are changed. If the finger members are not used, the intervals between the finger members are widened so that the finger members are prevented from being damaged when the finger members collide with walls or objects.

13 Claims, 5 Drawing Sheets

ROBOT HAND AND HUMANOID ROBOT HAVING THE SAME

CROSS-REFERENCE TO RELATED APPLICATIONS

This application claims the benefit of Korean Patent Application No. 10-2008-0131030, filed on Dec. 22, 2008, in the Korean Intellectual Property Office, the disclosure of which is incorporated herein by reference.

BACKGROUND

1. Field

The present disclosure relates to a robot hand and a humanoid robot having the same. More particularly, the present disclosure relates to a robot hand and a humanoid robot having the same, capable of reducing damage due to a collision.

2. Description of the Related Art

A robot is a mechanical device capable of automatically performing work or other operations and extensively used in various fields to substitute for a human or to assist human's work.

Recently, humanoid robots having an external appearance similar to a human and acting like a human have been developed. Similar to general industrial robots, the humanoid robots are applied to various industrial fields to perform work that is not as easily or not as frequently performed by a human.

Such a humanoid robot is provided with robot hands having shapes corresponding to the human hands so that the humanoid robot can perform work similar to the work performed by a human using the robot hands.

The humanoid robot includes a base member corresponding to the palm of the hand and the back of the hand, and finger members corresponding to human fingers. The finger members are rotatably coupled to the base member to grasp various objects while rotating.

However, the finger members have an elongated shape to perform a delicate operation similar to that performed by human hands, so that the finger members have relatively low strength as compared with that of other parts of the humanoid robot. In addition, since the finger members are positioned at the distal end of the humanoid robot, the finger members are subject to a collision with walls or objects, so that the finger members are easily damaged due to the collision.

SUMMARY

Accordingly, it is an aspect of the present disclosure to provide a robot hand and a humanoid robot having the same capable of reducing damage due to a collision.

It is another aspect of the present invention to provide a robot in which the intervals between the finger members are widened when the finger members are not used, therefore the finger members can be rotated to absorb shock when the finger members collide with walls or objects. Thus, the finger members can be prevented from being damaged due to the collision.

Additional aspects and/or advantages of the disclosure will be set forth in part in the description which follows and, in part, will be apparent from the description, or may be learned by practice of the disclosure.

The foregoing and/or other aspects of the disclosure are achieved by providing a robot hand including a plurality of finger members, and a base member, ends of the finger members being rotatably coupled to the base member, wherein the finger members are rotated through pneumatic pressure so that intervals between adjacent finger members are changed.

The robot hand further includes a roll joint to rotatably couple one end of the finger member to the base member, and an actuator which moves back and forth through pneumatic pressure to rotate the roll joint.

The roll joint is provided with a guide protrusion, which is rotatably installed at a leading end of the actuator and the actuator is provided at a leading end thereof with an elongated hole into which the guide protrusion is movably installed.

The robot hand further includes a position detecting sensor arranged at a rear end of the actuator to detect positions of the finger members.

The robot hand further includes a cylinder to which pneumatic pressure is transferred and a piston coupled to the actuator to move back and forth in the cylinder.

The robot hand further includes a resilient member to resiliently support the piston.

A plurality of actuators are provided corresponding to the roll joints to independently operate the finger members.

The actuator includes a plurality of connecting parts connected to the roll joints to simultaneously operate the finger members.

The foregoing and/or other aspects of the present invention are also achieved by providing a humanoid robot including a robot hand to grasp objects, wherein the robot hand includes a plurality of finger members and a base member to which respective ends of the finger members are rotatably coupled, and the finger members are rotated through pneumatic pressure so that intervals between adjacent finger members are changed.

The humanoid robot further includes an air tank in which air is stored and a regulator arranged in a fluid path between the air tank and the cylinder to adjust pressure of the air supplied into the cylinder.

The humanoid robot further includes an ejector, which receives the air through the regulator to generate negative pressure and a suction part coupled to the ejector in the finger member.

The humanoid robot further includes an on/off valve to connect at least one of the cylinder and the ejector with the regulator.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENTS

Figure 1:
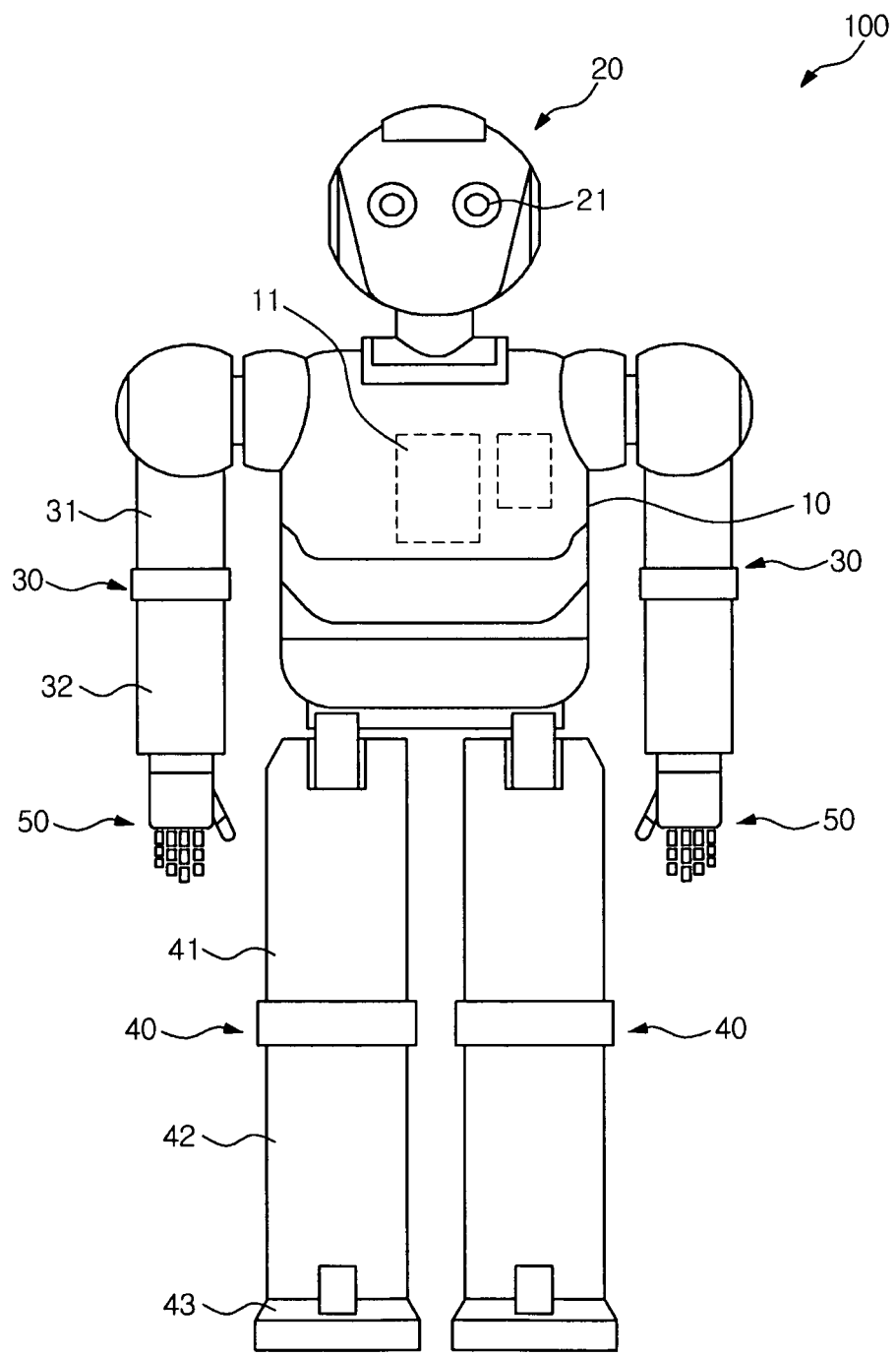
FIG. 1 is a schematic view showing a humanoid robot according to the embodiment of the present invention.

Reference will now be made in detail to the embodiments, examples of which are illustrated in the accompanying drawings, wherein like reference numerals refer to the like elements throughout. The embodiments are described below to explain the disclosure by referring to the figures.

As shown in FIG. 1, a humanoid robot 100 according to a first embodiment of the present invention includes a body 10, a head 20 connected to a top end of the body 10, a pair of arm assemblies 30 connected to both upper sides of the body 10, a pair of leg assemblies 40 connected to both lower sides of the body 10, and a pair of robot hands 50 installed at the arm assemblies 30 to grasp objects, respectively.

The head 20 is provided with a camera 21 serving as an eye and a microphone (not shown) serving as an ear for the humanoid robot 100. The body 10 is provided therein with a control unit 11 to control the humanoid robot 100 or a battery (not shown) to supply power. The arm assembly 30 includes an upper link 31 and a lower link 32. The leg assembly 40 includes a femoral link 41, a low leg link 42, and a foot 43.

Figure 2:
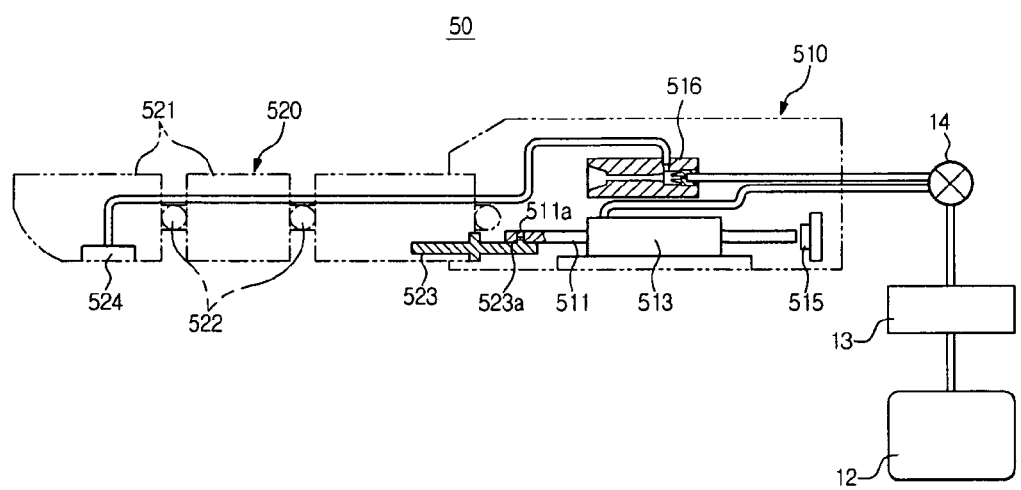
FIG. 2 is a view schematically showing an internal configuration of a humanoid robot according to the embodiment of FIG. 1.
Figure 3:
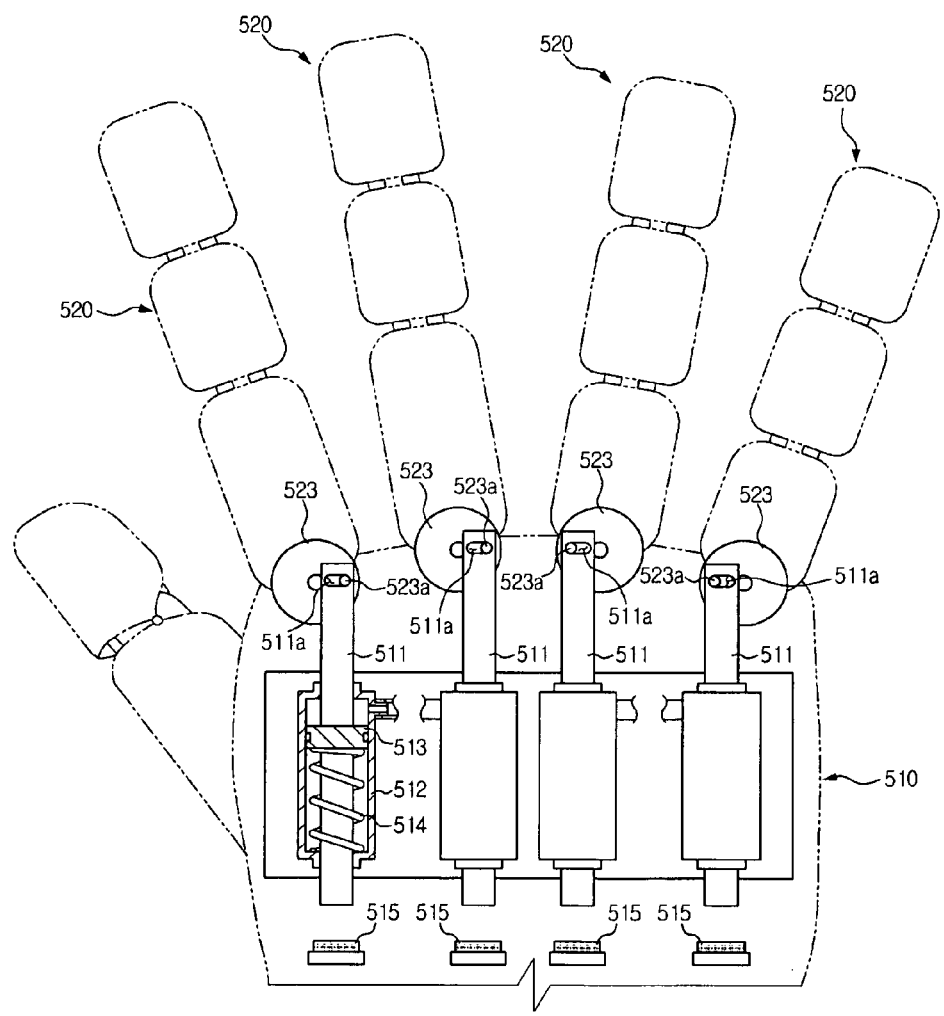
FIGS. 3 and 4 are views schematically showing a humanoid robot according to the embodiment of FIG. 1.

As shown in FIGS. 2 and 3, the robot hand 50 includes a base member 510 corresponding to the palm of the hand and the back of the hand, and finger members 520 corresponding to the human fingers.

The finger members 520 extend from one end of the base member 510 in the same direction so that the finger members 520 can perform operations corresponding to those of the index finger, the middle finger, the ring finger and the little finger.

Each of the finger members 520 includes a plurality of joints 522, which connect a plurality of link members 521 with each other. Although not shown in the drawings, the robot hand 50 is provided at the inside thereof with a driving device and a power transmission device to allow the link members 521 to rotate about the joints 522 such that the robot hand can grasp the objects.

According to the embodiment, the finger members 520 are rotatably installed at the base member 510 such that the intervals between the finger members 520 can be changed. This is to reduce damage of the finger members 520 in the event of a collision. That is, if the finger members 520 are not used, the intervals between the finger members 520 are widened so that the finger members 520 are rotated to absorb shock when the finger members 520 collide with walls or objects.

In addition, when the finger members 520 are rotated by operation of a motor, the shock due to the collision of the finger members 520 may be directly transferred to the motor thereby causing the motor to be damaged. Therefore, the finger members 520 according to the embodiment are rotated by pneumatic pressure so that damping effect is applied to the finger members 520.

According to the present embodiment, the robot hand 50 includes a roll joint 523 to rotatably couple the finger members 520 to the base member 510, an actuator 511 moving back and forth through pneumatic pressure to rotate the roll joint 523, a cylinder 512 to which the pneumatic pressure is transferred, a piston 513 installed in the cylinder 512 to move the actuator 511 back and forth, and a resilient member 514 to resiliently support the piston 513. The actuator 511 is installed in the middle of the piston such that the actuator 511 moves back and forth by the pneumatic pressure transferred to the cylinder 512. The roll joint 523 is formed with a stopping protrusion 523a which extends outward and to which a leading end of the actuator 511 is rotatably installed. The actuator 511 is formed at the leading end thereof with an elongated hole 511a, into which the stopping protrusion 523a is hooked such that the stopping protrusion 523a can move in a direction perpendicular to a moving direction of the actuator 511. According to the embodiment, a plurality of actuators 511, cylinders 512 and pistons 513 are provided in such a manner that a plurality of finger members 520 can be independently operated, respectively.

The actuator 511 includes a position detecting sensor 515 arranged at a rear end of the actuator 511. The position detecting sensor 515 is compressed by the actuator 511 to detect the positions of the finger members. Thus, when the robot hand 50 moves back due to a collision when the robot hand 50 is not in use, the position detecting sensor 515 detects the actuator 511 to notify a control unit 11 of occurrence of the collision.

The robot hand 50 includes an ejector 516, which receives air to generate suction force and a suction part 524, which is provided at the finger member and coupled to the ejector 516 in such a manner that the objects can be sucked by the suction force generated from the ejector 516. Thus, the robot hand can easily grasp the objects by using the suction force applied to the suction part 524.

Meanwhile, the humanoid robot 100 includes an air tank 12, in which the air to be supplied to the robot hand 50 is stored, a regulator 13, which transfers the air stored in the air tank 12 to the cylinder 512 with a predetermined pressure, and an on/off valve 14 arranged at a path among the cylinder 512, the ejector 516 and the regulator 13 to selectively transfer the pneumatic pressure to the cylinder 512 and the ejector 516. Thus, the pneumatic pressure can be selectively supplied to one of the cylinder 512 and the ejector 516.

Therefore, when the robot hand 50 is not used, the piston 513 and the actuator 511 move forward the finger member 520 by an elastic force of the resilient member 514 and rotate the roll joint 523 such that the intervals between the finger members 520 are widened. Since the finger members 520 are spaced apart from each other, when the finger members 520 collide with walls or objects, the shock due the collision is transferred to the resilient member 514 through the actuator 511 and the piston 513 while the finger members 520 are being rotated and then damped by the resilient member 514, thereby reducing the damage to the finger members 520 due to the collision. In addition, since the position detecting sensor 515 is compressed by a rear end of the actuator 511, which moves back due to the collision, the collision of the finger member 520 can be transferred to the control unit 11, so that the control unit 11 can control the humanoid robot 100 to avoid the collision.

Figure 4:
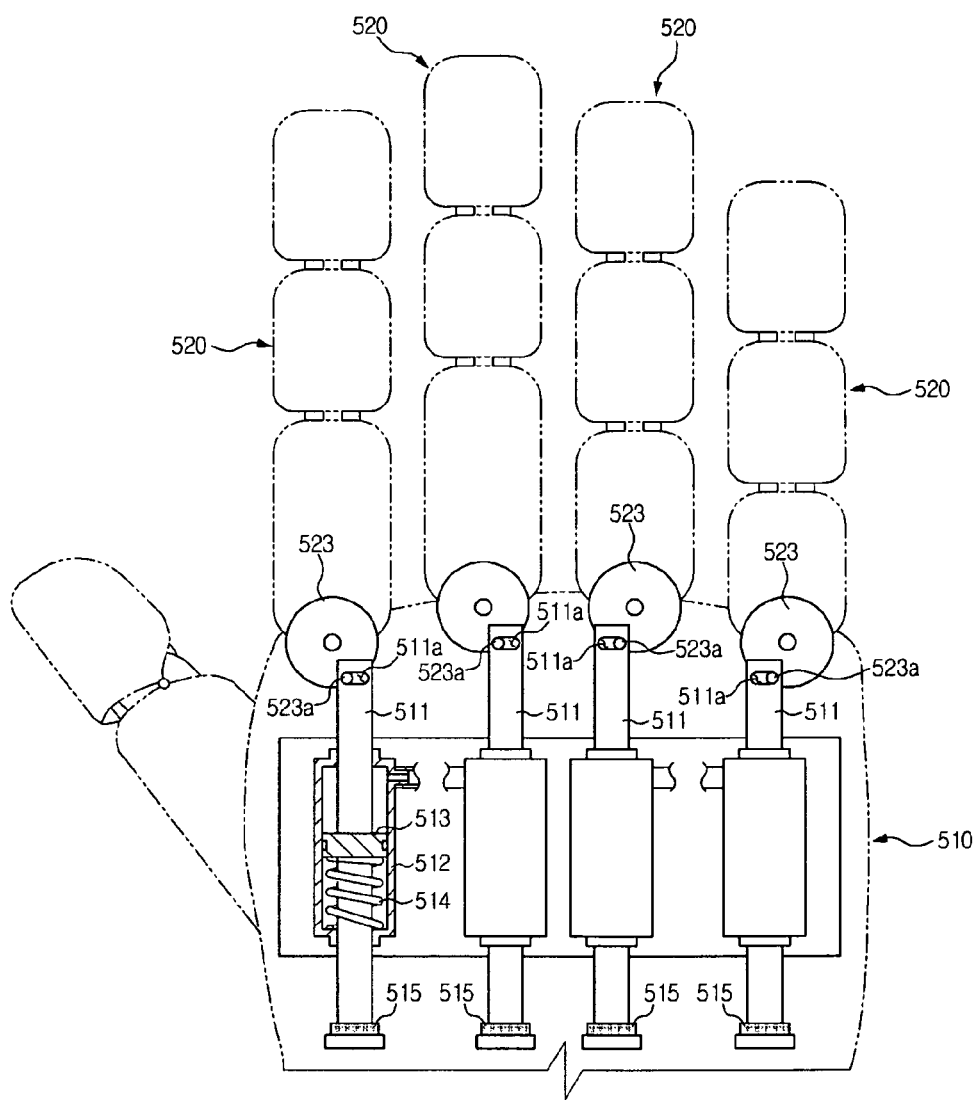

When the robot hand 50 is used, as shown in FIG. 4, a fluid path between the cylinder 512 and the regulator 13 is open by the operation of the on/off valve 14 to supply the cylinder 512 with the pneumatic pressure. Thus, the piston 513 and actuator 511 move back to rotate the roll joint 523 and the finger members 520 move closely to each other such that the intervals between adjacent finger members can be narrowed. At this time, according to the embodiment, the on/off valve 14 can open and close a fluid path between the ejector 516 and the regulator 13 as well as the fluid path between the cylinder 512 and the regulator 13. Since the fluid path between the ejector 516 and the regulator 13 is open together with the fluid path between the cylinder 512 and the regulator 13, a suction force is produced in the ejector 516 and then applied to the suction part 524 such that the suction part 524 can easily grasp the objects.

Figure 5:
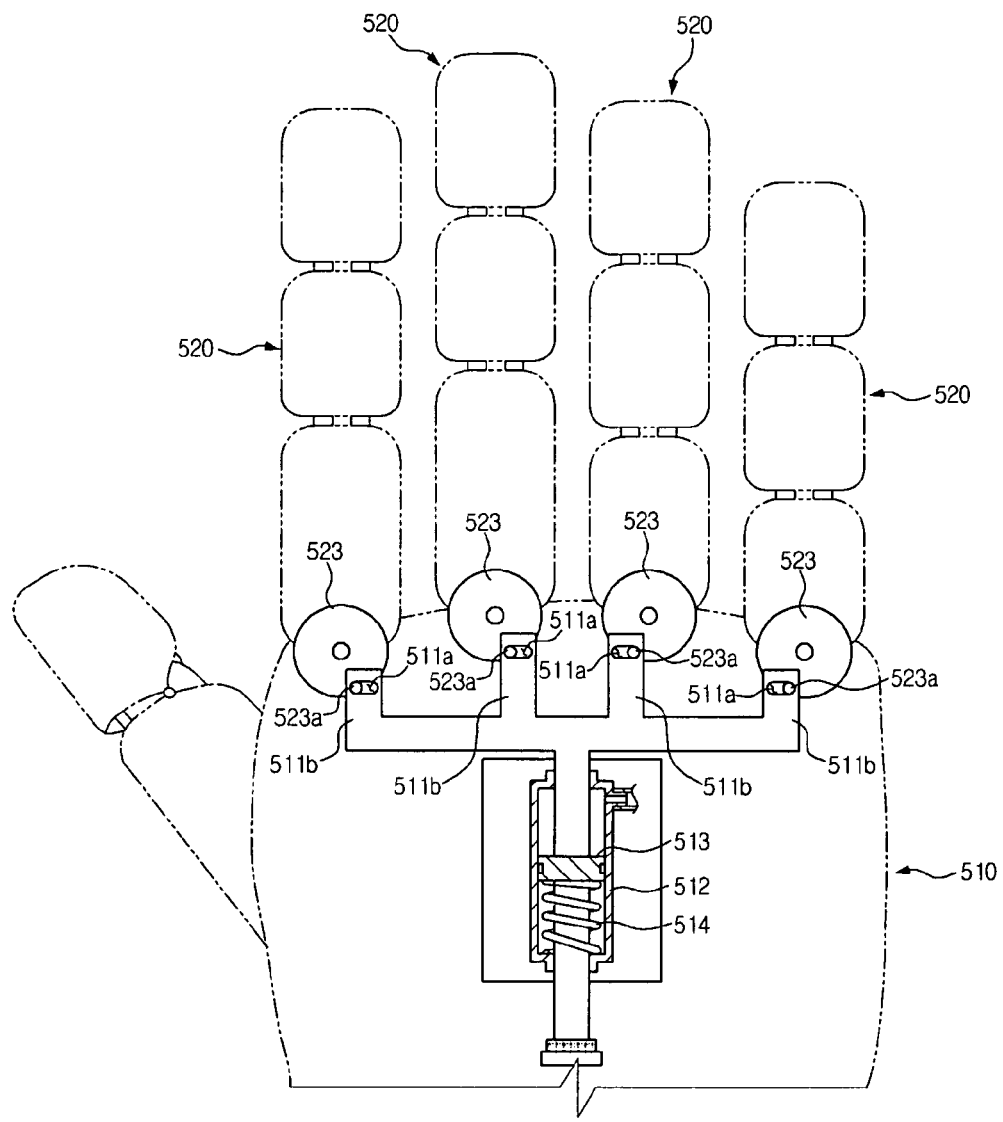
FIG. 5 is a view schematically showing a humanoid robot according to another embodiment of the present invention.

According to the embodiment, the robot hand 50 includes a plurality of actuators 511, cylinders 512 and pistons 51 in such a manner that each finger member 520 can be independently operated. However, the above embodiment is for illustrative purposes only. According to another embodiment, as shown in FIG. 5, an actuator 511 is provided with a plurality of connection parts 511b, which are connected to a plurality of roll joints 523 formed at the finger members 520, respectively, in such a manner that the finger members 520 can be simultaneously operated by one cylinder 512 and one piston 513.

Although the present embodiment has been described in that the on/off valve 14 can open and close the fluid path between the ejector 516 and the regulator 13 as well as the fluid path between the cylinder 512 and the regulator 13 at the same time, this is only illustrative purposes. For instance, the fluid path between the ejector 516 and the regulator 13 and the fluid path between the cylinder 512 and the regulator 13 may be open and closed by using a plurality of on/off valves 14, respectively.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot hand comprising:
a plurality of finger members;
a base member, ends of the finger members being rotatably coupled to the base member;
a roll joint to rotatably couple the respective ends of the finger members to the base member;
an actuator which moves back and forth through pneumatic pressure to rotate the roll joint; and
wherein the finger members are rotated through pneumatic pressure so that intervals between adjacent finger members are changed,
the roll joint comprises a guide protrusion, which is rotatably installed at a leading end of the actuator, and
the actuator defines, at a leading end thereof, an elongated hole into which the guide protrusion is movably installed.

2. The robot hand of claim 1, further comprising a position detecting sensor arranged at a rear end of the actuator to detect positions of the finger members.

3. The robot hand of claim 1, further comprising:
a cylinder to which the pneumatic pressure is transferred; and
a piston coupled to the actuator to move back and forth in the cylinder.

4. The robot hand of claim 3, further comprising a resilient member to resiliently support the piston.

5. The robot hand of claim 3, further comprising a plurality of the roll joints and a plurality of the actuators respectively corresponding to the roll joints to independently operate the finger members.

6. The robot hand of claim 3, wherein the actuator includes a plurality of connecting parts connected to the roll joints to simultaneously operate the finger members.

7. A humanoid robot comprising:
a robot hand to grasp objects; wherein the robot hand comprises a plurality of finger members and a base member to which respective ends of the finger members are rotatably coupled, and the finger members are rotated through pneumatic pressure so that intervals between adjacent finger members are changed,
a roll joint to rotatably couple the respective ends of the finger members to the base member; and
an actuator which moves back and forth through the pneumatic pressure to rotate the roll joint,
the roll joint comprises a guide protrusion, which is rotatably installed at a leading end of the actuator, and
the actuator defines, at a leading end thereof, an elongated hole into which the guide protrusion is movably installed.

8. The humanoid robot of claim 7, further comprising a position detecting sensor arranged at a rear end of the actuator to detect positions of the finger members.

9. The humanoid robot of claim 7, further comprising:
a cylinder to which the pneumatic pressure is transferred; and
a piston coupled to the actuator to move back and forth in the cylinder.

10. The humanoid robot of claim 9, further comprising a resilient member to resiliently support the piston.

11. The humanoid robot of claim 10, further comprising:
an air tank in which air is stored; and
a regulator arranged in a fluid path between the air tank and the cylinder to adjust pressure of the air supplied into the cylinder.

12. The humanoid robot of claim 11, further comprising:
an ejector, which receives the air through the regulator to generate negative pressure; and
a suction part coupled to the ejector in the finger member.

13. The humanoid robot of claim 12, further comprising an on/off valve to connect at least one of the cylinder and the ejector with the regulator.

* * * * *